US006610239B2

(12) United States Patent
McLaren

(10) Patent No.: US 6,610,239 B2
(45) Date of Patent: Aug. 26, 2003

(54) INJECTION MOLDING PROCESS USING A COATED MOLD

(75) Inventor: John W. McLaren, Cheboygan, MI (US)

(73) Assignee: Dow Global Technologies Inc., Midland, MI (US)

( * ) Notice: Subject to any disclaimer, the term of this patent is extended or adjusted under 35 U.S.C. 154(b) by 97 days.

(21) Appl. No.: 09/785,014

(22) Filed: Feb. 15, 2001

(65) Prior Publication Data

US 2002/0109268 A1 Aug. 15, 2002

Related U.S. Application Data

(60) Provisional application No. 60/182,616, filed on Feb. 15, 2000.

(51) Int. Cl.$^7$ .......................... B29C 33/56; B29C 33/62

(52) U.S. Cl. ..................... 264/300; 264/338; 264/328.1

(58) Field of Search ............................... 264/300, 338, 264/328.1; 249/115

(56) References Cited

U.S. PATENT DOCUMENTS

| | | | |
|---|---|---|---|
| 4,218,542 A | 8/1980 | Ukihashi et al. ............... 521/27 |
| 4,218,543 A | 8/1980 | Weber et al. .................. 521/51 |
| H444 H | * 3/1988 | Roth et al. .................. 264/45.1 |
| 5,008,065 A | * 4/1991 | Okumura et al. ......... 264/328.2 |
| 5,064,600 A | * 11/1991 | Wagner et al. ............ 264/328.6 |
| 5,106,874 A | 4/1992 | Porter et al. .................. 528/64 |
| 5,362,226 A | * 11/1994 | Kataoka et al. ............. 249/111 |
| 5,627,254 A | 5/1997 | Oriani .......................... 528/76 |
| 5,852,137 A | 12/1998 | Hsieh et al. ................. 525/458 |
| 5,936,018 A | 8/1999 | Müller et al. ............... 524/318 |

FOREIGN PATENT DOCUMENTS

| | | | |
|---|---|---|---|
| DE | 3137578 A | 4/1983 | |
| DE | 3333121 A | 3/1985 | |
| EP | 0341479 A | 11/1988 | |
| GB | 2035194 A1 | * 6/1980 | ........... B29D/27/04 |

OTHER PUBLICATIONS

Patent Abstracts of Japan, vol. 017, No. 670 (C–1139), Dec. 9, 1993 & JP 05 220241A (Sumitomo Rubber Ind. Ltd), Aug. 31, 1993 abstract.

Patent Abstracts of Japan, vol. 010, No. 249 (M–511), Aug. 27, 1986 & JP 61 079611A (C Uyemura & Co. Ltd. Others: 01), Apr. 23, 1986 abstract.

Patent Abstracts of Japan, vol. 017, No. 476 (E–1424), Aug. 30, 1993 & JP 05 114672A (Sony Corp), May 7, 1993 abstract.

Patent Abstracts of Japan, vol. 016, No. 440 (M–1310), Sep. 14, 1992 & JP 04 153010A (Sharp Corp), May 26, 1992 abstract.

Database WPI, Section Ch, Week 199538, Derwent Publications Ltd., London, GB, AN 1995–288917, XP002170773 & JP 07 186156A (Mitsui Eng & Shipbuilding Co.), Jul. 25, 1995.

Patent Abstracts of Japan, vol. 1998, No. 03, Feb. 27, 1998 & JP 09 300361A (Bridgestone Sports Co. Ltd.), Nov. 25, 1997 abstract.

Patent Abstracts of Japan, vol. 1997, No. 11, Nov. 28, 1997 & JP 09 183129A (Suzuki Motor Corp. ), Jul. 15, 1997 abstract.

Database WPI, Section Ch, Week 199511, Derwent Publications Ltd., London, GB; AN 1995–077886, XP 002170774 & JP 07 002542A (Olympus Optical Co. Ltd.), Jan. 6, 1995.

Patent Abstracts of Japan; vol. 010, No. 002 (M–444), Jan. 8, 1986 & JP 60 168613A (Sumitomo Baieru Urethane KK), Sep. 2, 1985 abstract.

Product Brochure, "How to use Nituff™ Teflon*Penetrated Hard Coat Anodizing for Performance and Competitive Advantage", Nimet Industries, Inc., South Bend, IN, 46619–0628, 1986 Nimet Industries, Inc.

Product Brochure, "NICOTEF® Teflon*–Rich Autocatalytic Nickel Plating for Increased Lubricity Uniform Coating Thickness Corrosion Resistance Superior Adhesion Good Wear Properties", Nimet Industries, Inc., South Bend, IN, 46619, 1990 Nimet NPC 89134.

Product Brochure, Introducing TRIBOCOAT™—A new Composite Electroless Coating that has the best Combination of Corrosion Resistance, Wear Resistance, Dry Lubrication and Adhesion Properties . . . Better Than Any Electroless Coating or any Electrolytic Coating on the Market Today. It will Improve your Productivity. Roehlen Industries N.A., Youngstown, OH 44509, Mar. 11, 1999.

(List continued on next page.)

Primary Examiner—Jill L. Heitbrink
Assistant Examiner—Monica A Fontaine
(74) Attorney, Agent, or Firm—Norman L Sims

(57) ABSTRACT

The invention comprises a mold useful for the preparation of a polyurethane based article comprising a metal coated on the surfaces to come in contact with the polyurethane materials wherein the coating is a continuous matrix of cobalt or nickel having dispersed in such discontinuous matrix a fluorinated polyolefin polymer. In another aspect the invention is a process for injection molding a part from polyurethane materials which process comprises injecting polyurethane based materials into a mold as described above, exposing the injected materials to conditions such that a solidified article is formed and removing the formed article from the mold. In another aspect the invention is an article comprising polyurethane material prepared by injection molding which contains about 0.5 percent by weight or less of an internal mold release and which can be coated in an industrial coating process without the need for a sealer coated on the article.

13 Claims, No Drawings

OTHER PUBLICATIONS

SR 1088—Coating of Nickel and Teflon on Metal Surfaces—Derwent Database; RD-409004A, May 10, 1998* (9827).

SR 1088—Coating of Nickel and Teflon on Metal Surfaces—Derwent Database, US 4098654A, Jul. 4, 1978 (7836).

SR 1088—Coating of Nickel and Teflon on Metal Surfaces—Derwent Database, US 3916506A, Nov. 4, 1975* (7547).

SR 1088—Coating of Nickel and Teflon on Metal Surfaces—Derwent Database, JP06240486A, Aug. 30, 1994* (9439) 4p.

SR 1088—Coating of Nickel and Teflon on Metal Surfaces—Derwent Database, JP07080876A, Mar. 28, 1995* (9521), 4p.

SR 1088—Coating of Nickel and Teflon on Metal Surfaces—Derwent Database, JP07207496A, Aug. 8, 1995* (9540) 7p.

SR 1088—Coating of Nickel and Teflon on Metal Surfaces—Derwent Database, DE19539872A1, Apr. 30, 1997* (9723) 6p.

* cited by examiner

INJECTION MOLDING PROCESS USING A COATED MOLD

This application claims the benefit of priority from provisional application Serial No. 60/182,616, filed Feb. 15, 2000 entitled "MOLD FOR INJECTION MOLDING AND INJECTION MOLDING PROCESS."

This patent application relates to a new mold for use in preparing polyurethane products by injection molding. This also relates to a new process for preparing parts by injection molding and to novel products prepared using such a process.

The largest number of articles prepared using polyurethane chemistry are prepared using injection molding. Generally in injection molding the components from which the part is to be prepared are injected into a mold and subjected to conditions such that the materials injected are solidified. Thereafter the article is removed from the mold. Polyurethanes have excellent adhesive characteristics. This is a disadvantage in removing a polyurethane material from a mold. To enhance the removal of the article from a mold it is common to spray the mold before the reactants are injected into the mold with an external mold release. The use of external mold release adds an extra step to the process and significantly reduces the productivity of any molding machine. Alternatively, an internal mold release, such as zinc stearate is placed in the materials used to form the article. The use of an internal mold release can reduce the number of times that a mold needs to be sprayed with an external mold release.

For parts such as body panels used in automotive uses which are coated in industrial coating processes, the internal mold release interferes with the application of industrial coatings to the part. To prevent the internal mold release from interfering with the coating of the part, it is accepted practice to seal the part after the part has been removed from the mold, cooled and washed. These parts or articles are typically sealed with a one part melamine based polyurethane material. The use of the sealer is very costly, up to 30 percent of the cost of the part.

What is desirable is to eliminate this sealing step for articles, which are to be coated in conventional industrial coating processes.

What is needed is a mold that can be used to make injection molded parts from polyurethane materials wherein the parts do not require the use of a sealer before being exposed to an industrial coating process. What is further needed is a process for preparing these parts or articles using polyurethane based starting materials. What is further needed are polyurethane injection molded parts which do not require the use of a sealer before being used in an industrial coating process.

SUMMARY OF INVENTION

In one aspect, the invention comprises a mold useful for the preparation of a polyurethane based article wherein the mold comprises a metal in the necessary shape to prepare an article of the desired shape which mold has a coating on the surfaces of the mold to come in contact with the polyurethane materials from which the article will be made, wherein the coating is a continuous matrix of cobalt or nickel having dispersed in such continuous matrix a fluorinated polyolefin polymer.

In another aspect the invention is a process for injection molding a part from polyurethane materials which process comprises injecting a two-part polyurethane composition or a thermoplastic polyurethane prepolymer into a mold as described above, exposing the injected materials to conditions such that a solidified article is formed and removing the formed article from the mold.

In yet another embodiment the invention is an article comprising polyurethane material prepared by injection molding which contains 0.5 percent by weight or less of an internal mold release and which can be coated in an industrial coating process without the need for a sealer coated on the article.

The molds and process of the invention allow the preparation of a polyurethane article which can be coated in an industrial process without the need for a sealer on the outside surface of the article. Furthermore the mold and process allow the preparation of in excess of 200 articles without the need for spraying the mold with an external mold release. Furthermore the use of the coated mold allows for faster injection time of the raw materials and allows the use of a material with a lower amount of internal mold release than used in an uncoated mold.

DETAILED DESCRIPTION OF THE INVENTION

The molds of the invention comprise a metal mold of any desired shape which is commonly used for injection molding. The metal can be any metal which is commonly used for injection molding such as steel or aluminum. The mold has a coating on the interior surface of the mold which comes in contact with the material to be molded. That coating comprises a continuous matrix of a metal comprising nickel or cobalt, preferably nickel, having dispersed in the continuous matrix a fluorinated polyolefin polymer, preferably polytetrafluoroethylene. The amount of metal present shall be a sufficient amount such that the metal is a continuous matrix. The amount of fluorinated polyolefin present is that amount sufficient to improve the wetting or lubricity of the coating. Preferably the amount of fluorinated polyolefin in the coating is about 10 percent by weight of the coating or greater, more preferably about 20 percent by weight or greater of the coating and most preferably about 23 percent by weight or greater of the coating. Preferably the amount of the fluorinated polyolefin is about 50 percent by weight or less of the coating, more preferably about 30 percent by weight or less and most preferably on the interior surface, which is in contact with the injected material about 25 percent by weight or less of the coating.

The amount of metal in the coating is about 50 percent by weight or greater, preferably 70 percent by weight or greater and most preferably 75 percent by weight or greater. Preferably the amount of metal in the coating is about 70 percent by weight or less, more preferably 80 percent by weight or less, and most preferably 77 percent by weight or less.

The coating on the mold is preferably 0.0006 of an inch or greater, more preferably about 0.0015 of an inch or greater. Preferably the thickness of the coating is about 0.003 inches or less, more preferably about 0.002 inches or less. Generally, the mold is coated by an electorcoating process. Such processes are well known in the art and generally comprise placing the mold into a bath containing the metal and fluorinated polyolefin, applying current to the part or mold under conditions such that a coating of the metal and fluorinated polyolefin of the desired thickness is placed on the interior surface of the mold.

The coatings used to coat the mold are commercially available. One such coating is available from Roehlen Industries NA of Youngstown, Ohio under the trademark TRIBOCOAT, also available from Nimet Industries, South Bend, Ind. under the trademark NiCoTeF Coatings. Other useful coatings are coatings available from Melco Engraving. For aluminum molds coatings available from Nimet Industries, Inc., South Bend, Ind. under the trademark NiCoTef coatings can be used. Another coating is 25 percent polytetrafluoroethylene in 75 percent nickel available from Hall Technologies.

The articles of the invention can generally be prepared by injecting the raw materials into the mold and exposing them to conditions such that a solidified article is prepared. The process does not require coating the mold with an external mold release before the preparation of every part. The parts can be easily removed from the mold without adhesion of the polyurethane part to the mold surface. In one embodiment this process can be used for injection molding. In injection molding, a thermoplastic polyurethane prepolymer is heated above its melt temperature and injected into a mold. The material is cooled to below its melt temperature so as to solidify the thermoplastic polyurethane. Hereafter the solidified part of the desired shape is removed from the mold. Thermoplastic polyurethanes which can be used in this process are well known to those of average skill in the art and are disclosed in U.S. Pat. No. 5,627,254 incorporated herein by reference.

In another process parts are prepared by reaction injection molding. In reaction injection molding, an isocyanate terminated prepolymer or an isocyanate is injected into a mold at the same time a material having groups are reactive with an isocyanate injected into the mold. Processes for reaction injection molding are described in U.S. Pat. No. 4,218,543 and U.S. Pat. No. 5,106,874 both incorporated herein by reference. Further, a catalyst for the reaction of an isocyanate with an isocyanate reactive compound may be included in the materials injected into the mold. Generally, isocyanates useful in the preparation of reaction injection molded polyurethane parts are well known and described in U.S. Pat. No. 5,852,137, column 2, line 40 to column 3, line 43 and U.S. Pat. No. 5,106,874, column 6, line 52 to column 7, line 8 incorporated herein by reference. Generally polyols or isocyanate reactive materials, such as polyols, which may be used in the preparation of reaction injected molded articles are well known to those skilled in the art and described in U.S. Pat. No. 5,852,137, column 3, line 46 to column 4, line 64 herein incorporated by reference. Catalysts useful for the reaction of an isocyanate terminated prepolymer with a polyol are well known to those skilled n the art and described in U.S. Pat. No. 5,852,137, column 7, line 56 to column 8, line 24 also U.S. Pat. No. 4,218,542, column 10, line 26 to column 11, line 30 incorporated herein by reference. The tin catalysts described are preferred for use in this process.

The reactants for the RIM process may also include chain extenders known in the art. Such chain extenders are disclosed in U.S. Pat. No. 5,106,874 at column 9, line 13 to column 9, line 50, incorporated herein by reference.

Generally the molds are preheated prior to injection of the raw materials. Preferably the mold is preheated to a temperature of from about 65° C. to about 85° C. The raw materials can be injected anywhere from ambient temperature about 23° C. to about 70° C., preferably up to about 60° C.

Generally, the materials have a residence time in the mold of from about 20 to about 30 seconds. Such articles generally are elastomeric in nature. These articles can be easily removed from the molds.

In another embodiment the foam polyurethane articles can be prepared. The isocyanate prepolymer or polyisocyanate, material reactive with a polyurethane or isocyanate moiety and catalyst are injected into the mold along with a blowing agent. The presence of a blowing agent forms cells in the matrix of the polyurethane therefore forming a foam. Blowing agents useful in this process are well known to those skilled in the art and are described in U.S. Pat. No. 4,218,543 at column 11, line 30 to column 11, line 54 incorporated herein by reference.

In yet another embodiment the materials injected into the mold can contain a cross-linking agent to improve the structure of the foam. Cross-linking agents commonly known in the art can be used in this process. Such cross-linking agents are disclosed in U.S. Pat. No. 5,106,874, column 9, line 51 to column 9, line 66 incorporated herein by reference. The articles prepared from this invention comprise polyurethane elastomers and foams. Such foams generally contain an amount of internal mold release such as zinc stearate, of 0.5 percent by weight of the article or less and more preferably 0.2 percent by weight of the article or less. In some embodiments it may be desired to spray the mold with an external mold release prior to the initial preparation of an article of the invention. The use of coated molds of the invention allow for the preparation of greater than 200 articles between applications of an external mold release to the mold surface.

Many of the articles of the invention are used in the preparation of articles which require a coating. In one example, an article of the invention is a body panel for an automobile or truck. Such body panels must be primed, coated with a base coat and coated with a clear coat. This requires passing the article through an oven to cure the various coats. The molds of the invention allow the preparation of articles which can be coated via this described process without further application of a sealer to the article.

A further advantage of the molds of the invention is that the molds require less frequent cleaning and therefore improved productivity of the molds.

The following example is provided to illustrate the invention and is not intended to limit the scope of the claims. Unless otherwise stated all parts and percentages are by weight.

EXAMPLE

A plaque mold insert was polished and treated with a nickel (75 percent) polytetrafluoroethylene (25 percent) coating composition. The plaque mold insert was placed into a reaction injection molding machine. The mold was cleaned, sprayed with Chemtrend RCTW 2006 mold release available from Chemtrend, buffed with cheese cloth and sprayed with mold release again. In one set of runs a plaque mold insert without the coating was used. In another a plaque mold insert was used which was coated as described. Plaques were molded using SPECTRIM™ BP 80 two part polyisocyanate polyol formulations available from The Dow Chemical Company. Nine plaques were molded using the uncoated mold insert before the plaques began to stick. Twenty plaques were molded using the coated plaque mold insert before the plaques started to stick.

The coated plaque mold insert was installed on a Cincinnati Milacron HT RRIM processing machine. Over 1000 plaques have been molded using the mold. No noticeable reduction of the quality of the coating was observed. Further, it is easier to remove urethane build up from the surface of the coated mold.

What is claimed is:

1. A process far preparing a polyurethane article which comprises (a): injecting into a mold, wherein the interior surface of the mold is coated with a coating comprising a continuous matrix of nickel or cobalt having dispersed therein about 10 to about 30 percent by weight based on the coating of a fluorinated polyolefin, (i) a thermoplastic polyurethane, or (ii) a polyisocyanate or isocyanate prepolymer and a material having on average more than one group reactive with an isocyanate; wherein (i) or (ii) come into contact with the coating; (b) exposing the material injected into the mold to conditions wherein a solid mass is prepared; and (c) removing the formed article from the mold.

2. A process according to claim 1 wherein the fluorinated polyolefin is present in an amount of about 20 to about 30 percent by weight of the coating.

3. A process according to claim 2 wherein the thickness of the coating on the interior mold surface is about 0.0006 inch to about 0.003 inch.

4. A process according to claim 3 wherein the thickness of the coating on the interior mold surface is about 0.0015 inch to about 0.002 inch.

5. A process according to claim 4 wherein the continuous matrix is nickel.

6. A process according to claim 5 wherein the fluorinated polyolefin is polytetrafluoroethylene.

7. The process of claim 1 wherein the amount of the continuous matrix in the coating is from about 50 to about 80 percent by weight.

8. The process of claim 7 wherein the amount of fluorinated polyolefin in the coating is from about 20 to 30 percent by weight.

9. The process of claim 2 wherein the amount of the continuous matrix in the coating is from about 70 to about 80 percent by weight.

10. The process of claim 1 wherein the material injected into the mold contains about 0.5 percent by weight or less of internal mold release.

11. The process of claim 10 wherein the material injected into the mold contains about 0.2 percent by weight or less of internal mold release.

12. The process of claim 10 wherein the coating is capable of being used for more than 200 articles between applications of an external mold release.

13. The process of claim 10 wherein the coating is capable of being used for more than 1000 articles between applications of an external mold release.

* * * * *